March 11, 1958     F. R. DRAPER     2,826,093
ADJUSTERS FOR THE SHOES OF INTERNAL SHOE DRUM BRAKES
Filed Aug. 15, 1955
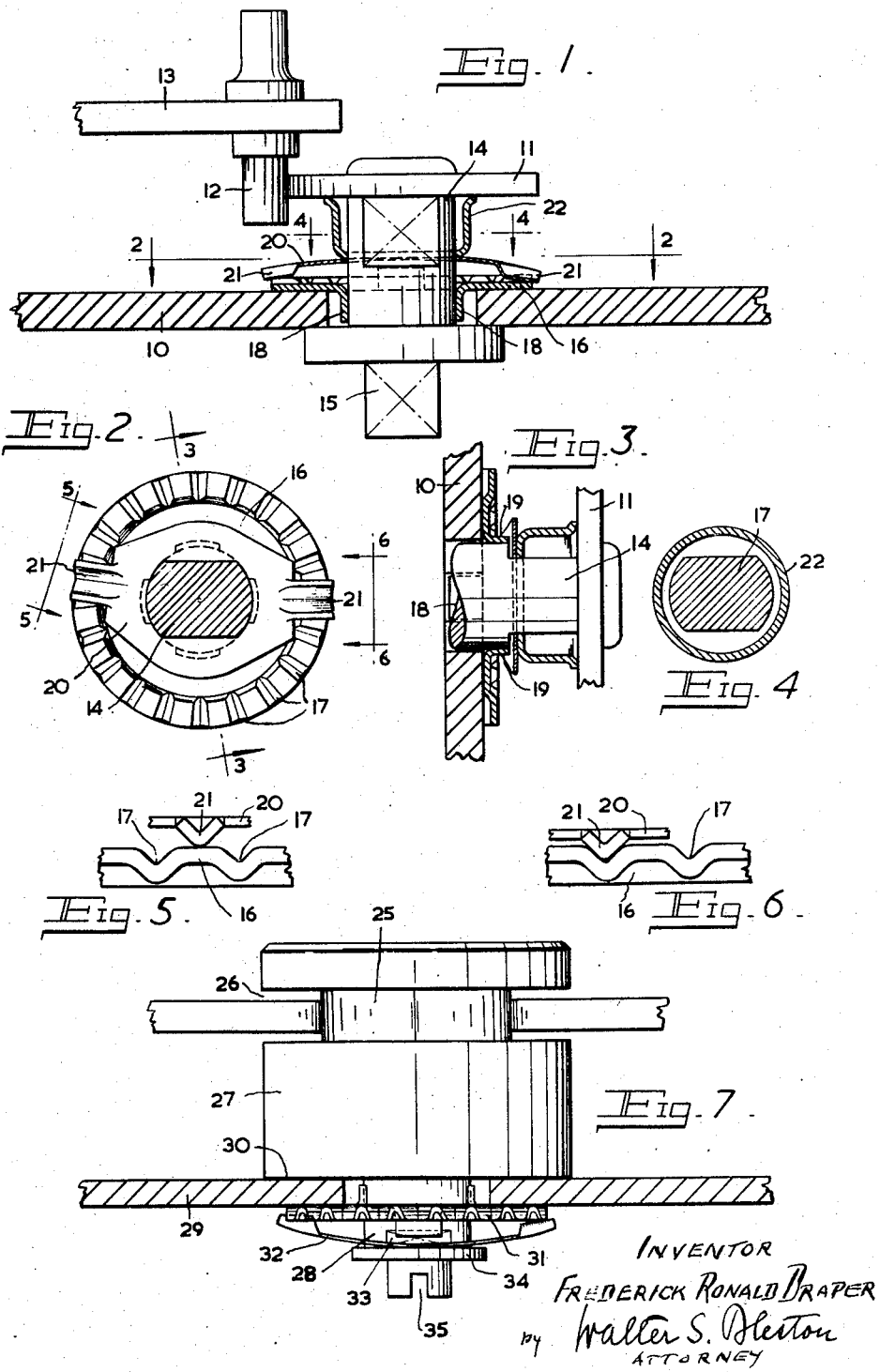
INVENTOR
FREDERICK RONALD DRAPER
by Walter S. Heaton
ATTORNEY United States Patent Office 2,826,093
Patented Mar. 11, 1958

2,826,093

ADJUSTERS FOR THE SHOES OF INTERNAL SHOE DRUM BRAKES

Frederick Ronald Draper, Birmingham, England, assignor to Girling Limited, Birmingham, England, a British company Application August 15, 1955, Serial No. 528,310

Claims priority, application Great Britain August 21, 1954

4 Claims. (Cl. 74—527)

This invention relates to adjusters for the shoes of internal shoe drum brakes, and refers particularly to an adjuster of the type comprising an angularly movable cam member which is mounted on the back plate of the brake and is accessible from the outer side of the back plate for adjusting the off position of one or both shoes of the brake.

According to the invention an adjuster cam for a brake shoe or shoes is integral with or is carried by a spindle extending through an opening in the back-plate of the brake and a blade or plate spring keyed on the spindle has one or more radial teeth adapted to co-operate resiliently with a radially grooved or serrated plate keyed to the back-plate so that the spindle is effectively located in any angular position in which it is set and will not move under vibration or other forces.

The cam may be a snail cam forming an adjustable stop for a peg on a brake shoe to define the off position of the shoe or it may be a double-sided cam for engagement by the ends of both shoes and forming an anchorage and an adjuster for the shoes.

Two practical forms of brake shoe adjuster embodying the invention are illustrated by way of example in the accompanying drawings in which:

Figure 1 is a section of an adjuster and the associated parts of the brake.

Figure 2 is a section on the line 2—2 of Figure 1.

Figure 3 is a section on the line 3—3 of Figure 2.

Figure 4 is a section on the line 4—4 of Figure 1.

Figure 5 is a fragmentary view in the direction of the arrows 5—5 in Figure 2 showing a spring detent tooth riding on the space between two serrations in the fixed plate.

Figure 6 is a similar view in the direction of the arrows 6—6 in Figure 2 showing a tooth engaged in a serration.

Figure 7 is a section of an alternative form of adjuster.

In the brake shoe adjuster illustrated in Figures 1 to 6, 10 is the fixed back-plate of the brake and 11 is a snail cam cooperating with a peg 12 on a brake shoe 13 for adjusting the off position of the shoe.

The cam is mounted on the inner end of a spindle 14 which extends through an opening in the back-plate and the outer end of which is squared as shown at 15 or otherwise formed to receive a spanner or key for moving it angularly.

The spindle is held in any angular position in which it is set by a locating device of which the fixed part is a dished disc 16 having a central opening to fit over the spindle on the inner side of the back-plate.

The annular portion of the disc around the opening is flat and lies against the back-plate, and around that there is a raised rim in which are formed angularly spaced radial serrations 17. These are preferably of V cross-section, as shown more particularly in Figures 5 and 6, the V being of 90° angle, and there is an even number of serrations. Two tongues 18 are formed on the disc on opposite sides of the central hole and are bent at right angles to the plane of the disc to engage in complementary notches in the edge of the hole in the back-plate for the spindle in order to key the disc against angular movement. There are two other intermediate tongues 19 bent in the opposite direction and adapted to be engaged by a part of the assembly to hold the disc against the back-plate.

The co-operating spring 20 is a bowed strip of spring steel having at each end a tooth 21 formed by folding an extension of the strip to V section. The two teeth are not diametrically opposed but one is displaced angularly from the diameter on which the other lies by an angle equal to half the angular spacing between the serrations on the disc. This is clearly shown in Figure 2. Thus only one tooth on the spring is in engagement with a serration in the disc at one time and the adjustment of the cam can be effected in angular steps equal to half the spacing of the serrations. The spring has a central slot which fits over opposed flats on the spindle to key the spring to the spindle and axial pressure is applied to the spring to hold it in engagement with the disc by a distance piece 22 in the form of a cup shaped by pressing and mounted on the spindle between the spring and the cam 11.

In the adjuster shown in Figure 7 the cam 25 forms an anchorage and adjuster for the ends of both shoes of a brake remote from the actuator, the cam surfaces being formed by the base of a groove 26 in a cylindrical member 27 of substantial diameter. On the outer end of the member there is a reduced axial extension or stem 28 which projects through an opening in the back-plate 29, the step or shoulder 30 at the inner end of the stem bearing against the inner surface of the back-plate. The disc 31 and spring 32 are of exactly the same form as the disc 16 and spring 20 described above and are mounted on the stem 28 outside the back-plate. The spring is keyed to the stem by flats 33 on the stem and axial pressure is applied to it by a shoulder or collar 34 on the stem. The disc is keyed to the back-plate by tongues on the disc engaging in notches in the opening in the back-plate. The outer end of the stem is slotted as shown at 35 or otherwise formed to receive a tool for moving the cam angularly.

I claim:

1. A clicker mechanism for spindles comprising a disc having a hole therethrough, a plurality of angularly spaced radially extending serrations on an outer zone of said disc, a rotatable spindle passing through said hole, a blade spring keyed to said spindle, said spring being bowed cylindrically with its concave side towards said disc, opposed extensions of the edges of said spring, teeth formed on said extensions and adapted to engage said serrations, and means acting against the central bowed portion of said spring to urge said extensions resiliently against said serrations.

2. A clicker mechanism for spindles comprising a disc having a hole therethrough, an even number of angularly spaced radially extending V-section serrations on an outer zone of said disc, a rotatable spindle extending through said hole, a bowed blade spring keyed on said spindle so as to face said disc with a concave side of said spring, first and second opposed radial extensions on said spring, first and second radial V-section teeth, respectively, on said extensions adapted to engage said serrations, said first tooth being displaced angularly from the diameter on which said second tooth lies by an angle equal to half the angular spacing between said serrations, said blade spring being urged with said teeth into engagement with said disc.

3. A clicker mechanism for the adjuster cam for the shoes of an internal shoe drum brake, said brake having a backplate and a cam-bearing spindle passing therethrough, said mechanism comprising a disc having a hole therethrough, through which said spindle passes, a plurality of angularly spaced serrations on an outer zone of said disc, bent tongues on said disc, said tongues being adapted to engage openings in said backplate to locate said disc, a bowed blade spring keyed to said spindle and having its concave side adjacent said disc, outward radial extensions on said spring, radial V-shaped teeth formed on said extensions with their convex sides towards said disc opposite said serrations, and means urging said blade spring towards said disc whereby said teeth resiliently engage said serrations.

4. A clicker mechanism for the adjuster cam for the shoes of an internal shoe drum brake, said brake having a backplate and a cam-bearing spindle passing therethrough, said mechanism comprising a disc having a hole therethrough, through which said spindle passes, a plurality of angularly spaced serrations on an outer zone of said disc, bent tongues on said disc, said tongues being adapted to engage openings in said backplate to locate said disc, a bowed blade spring keyed to said spindle and having its concave side adjacent said disc, first and second opposed radial extensions on said spring, first and second radial V-section teeth, respectively, on said extensions adapted to engage said serrations, said first tooth being displaced angularly from the diameter on which said second tooth lies by an angle equal to half the angular spacing between said serrations, said blade spring being urged with said teeth into engagement with said disc.

References Cited in the file of this patent

UNITED STATES PATENTS

| | | |
|---|---|---|
| 2,164,866 | Baisch | July 4, 1939 |
| 2,195,261 | Rasmussen et al. | Mar. 26, 1940 |
| 2,489,626 | Doucette | Nov. 29, 1949 |
| 2,531,246 | Batcheller | Nov. 21, 1950 |